US006198873B1

(12) United States Patent
Takano

(10) Patent No.: US 6,198,873 B1
(45) Date of Patent: *Mar. 6, 2001

(54) EDITING SYSTEM AND VIDEO SIGNAL OUTPUT SYSTEM

(75) Inventor: Masayuki Takano, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/706,604

(22) Filed: Sep. 5, 1996

(30) Foreign Application Priority Data

Sep. 8, 1995 (JP) .................................................. 7-231431

(51) Int. Cl.[7] .............................................. H04N 27/00
(52) U.S. Cl. ........................... 386/55; 348/705; 348/578; 348/722; 340/825.79; 386/53
(58) Field of Search ........................... 386/4, 52, 53, 386/60, 62, 64, 65, 55.125; 348/552, 599, 705, 722, 578; 360/13; 364/192; 369/83; 345/328; 340/825.79

(56) References Cited

U.S. PATENT DOCUMENTS

| | | | |
|---|---|---|---|
| 4,178,613 | * 12/1979 | Takahashi et al. | 358/183 |
| 4,717,971 | * 1/1988 | Sawyer | 358/342 |
| 4,796,099 | * 1/1989 | Compton | 358/342 |
| 5,132,798 | * 7/1992 | Yoshimura et al. | 358/183 |
| 5,218,672 | * 6/1993 | Morgan et al. | 395/162 |
| 5,276,445 | * 1/1994 | Mita et al. | 340/825.79 |
| 5,307,456 | * 4/1994 | MacKay | 395/154 |
| 5,343,193 | * 8/1994 | Shoda et al. | 340/825.79 |
| 5,355,173 | * 10/1994 | Fujita | 348/590 |
| 5,452,096 | * 9/1995 | Ito | 358/311 |
| 5,488,428 | * 1/1996 | Akashi et al. | 348/578 |
| 5,497,244 | * 3/1996 | Chargin, Jr. et al. | 358/335 |
| 5,519,448 | * 5/1996 | Nagasawa et al. | 348/559 |
| 5,530,434 | * 6/1996 | Kanda | 340/825.79 |
| 5,532,830 | * 7/1996 | Schuler | 386/125 |
| 5,568,275 | * 10/1996 | Norton et al. | 386/52 |
| 5,680,358 | * 10/1997 | Hashimoto et al. | 365/221 |
| 5,701,385 | * 12/1997 | Katsuyama et al. | 386/106 |

OTHER PUBLICATIONS

Tonomura et al., Content Oriented Visual Interface Using Icons for Visual Data. Systems, 1990 Acedemic Press Lim. pp. 183–198, Jan. 1990.*

* cited by examiner

Primary Examiner—Wendy Garber
Assistant Examiner—Vincent F. Boccio
(74) Attorney, Agent, or Firm—Frommer, Lawrence & Haug, LLP.; William S. Frommer; Gordon Kessler

(57) ABSTRACT

An editing system and a video signal output system are disclosed. The inventive system comprises a server for reproducing video signals for a plurality of scenes from disk drives and for consecutively outputting these video signals through a single output port, a frame memory for storing one frame of video signals from the output port, a special effect processor for receiving both the output of the memory and the video signals from the output port, and a controller for controlling the writing and reading of data to and from the frame memory as well as the retaining operation of data in that memory. The controller controls the frame memory so that the latter will continuously supply the special effect processor with the video signal representing the last frame of a given scene for a predetermined period of time, thereby allowing the processor to output the video signal having undergone special effect processing. The video signals may be processed in units of fields instead of frames.

8 Claims, 6 Drawing Sheets

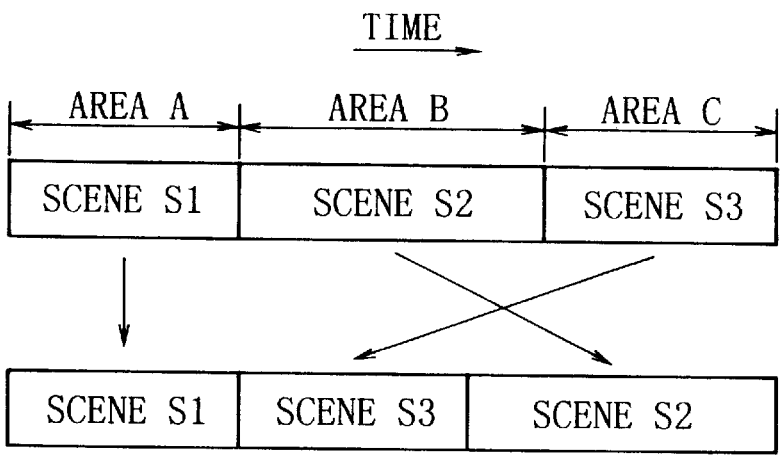
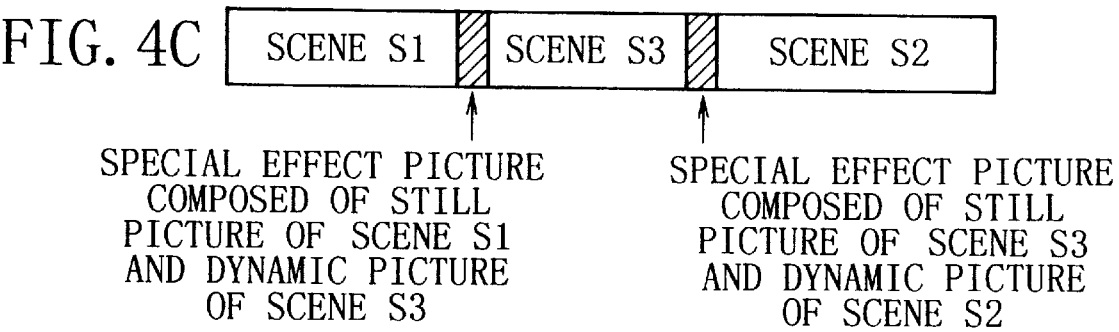

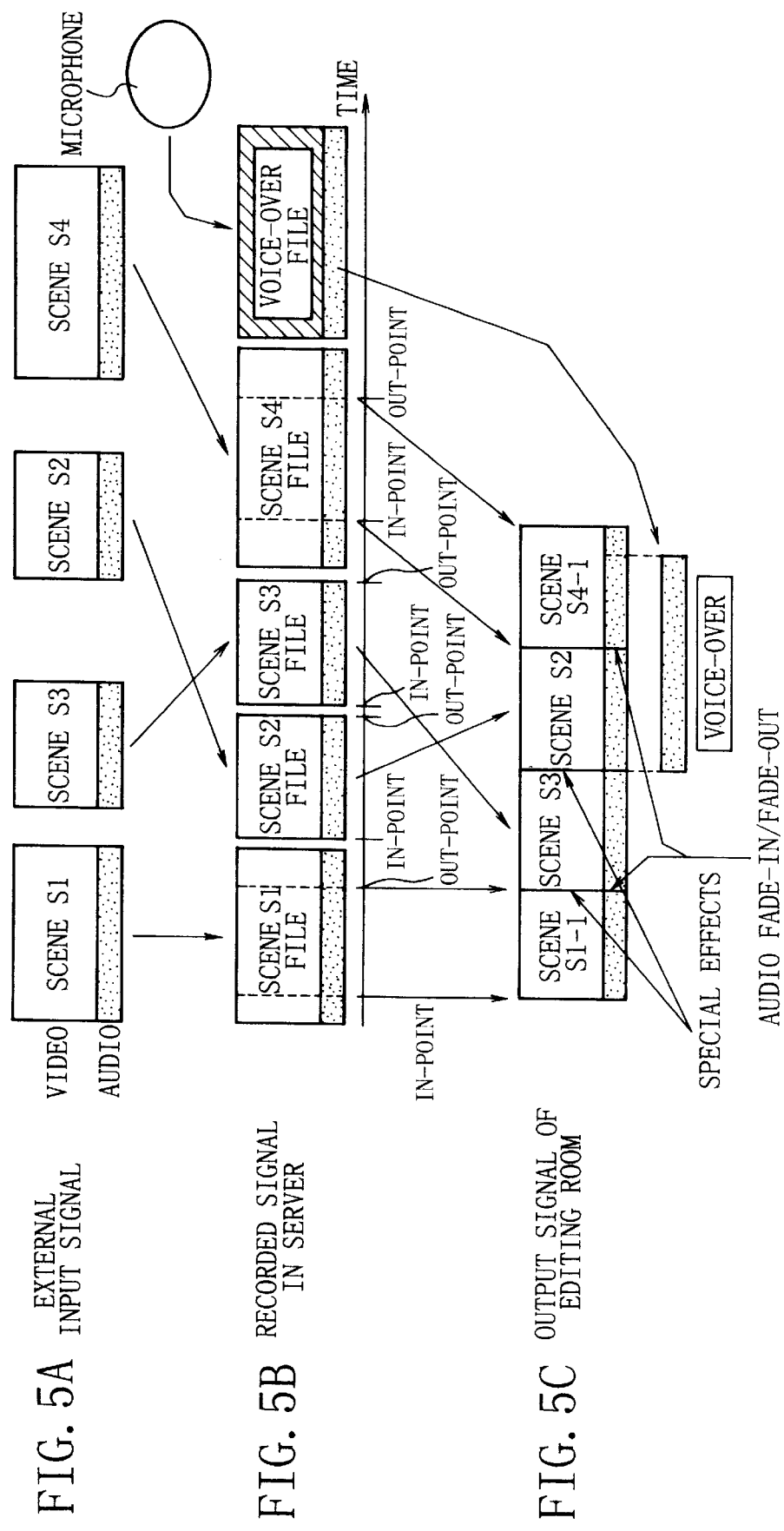

EDITING SYSTEM AND VIDEO SIGNAL OUTPUT SYSTEM

BACKGROUND OF THE INVENTION

The present invention relates to an editing system and a video signal output system. More particularly, the invention relates to an editing system and a video signal output system comprising a server using disk drives.

Broadcasting stations and like institutions employ special effect processors that temporarily mix two or more kinds of video signals for video output involving special effects.

Illustratively, the special effect processor provides such special visual effects as fade-in/fade-out, mix, dissolve, wipe and page turn. For fade-in/fade-out, a first video signal is replaced progressively by a second video signal for video output, the first video signal being faded out even as the second video signal is faded in. Mix and dissolve basically involve mixing the first and the second video signals over a certain period of time for output at the point in time of switchover between the two signals. Page turn is one of the nonlinear effects brought about upon switchover between the two video signals.

As shown in FIG. 1, a special effect processor 100 of the above kind has two input terminals 101 and 102. The input terminal 101 receives a signal X which is a first video signal; the input terminal 102 admits a signal Y, a second video signal. The special effect processor 100 adds various special effects to the input signals and outputs a processed video signal from an output terminal 103.

Where the special effect processor 100 is to add such special effects as fade-in/fade-out, mix, dissolve, wipe and page turn to its input signal, it is necessary that the first and the second video signals upon switchover therebetween be input simultaneously to the special effect processor 100 for a predetermined period of time.

That in turn requires that two of the video signals output by external storage devices such as VTR's and disk recording and reproducing devices be input parallelly to the special effect processor 100 at least near the point in time of video signal switchover. Conventionally, at least two signal lines are derived from external storage devices so as to supply necessary video signals to the special effect processor.

The applicant of the present invention already proposed a video signal server (abbreviated to the server hereunder) using a disk storage medium. As depicted in FIG. 2, the server has one or a plurality of input terminals 111 receiving video signals. The input video signals are stored on a disk inside the server 110. The video signals for the scenes requested by users are read from the disk, converted to a necessary transmission format, and sent to the respective users over transmission lines 112.

The server 110 may include a plurality of disks to increase storage capacity and to enhance write speed. Using high-speed read-out techniques, the server 110 offers more output channels than the number of recording and reproducing devices that may be configured.

The server 110 is required to provide a plurality of users simultaneously with the video signals meeting their respective needs. The greater the number of users that the server 110 is capable of simultaneously supplying video signals to, the more valuable the server 110 is considered.

When a user is to edit video signals using the special effect processor 100 of FIG. 1, the user needs to be assigned two channels, i.e., two output ports for the reasons mentioned above. That means a decrease in the number of users who may be supplied simultaneously with their necessary video signals.

Thus when the server 110 is used as part of the special effect processor 100 in the broadcasting station, all users (including an editor and a producer) must be assigned two ports each. This effectively halves the number of users who may be fed simultaneously with the video signals they require. The result is a failure to utilize efficiently the output ports of the server 110.

If the number of users receiving video signals simultaneously is not to be reduced, it is necessary to double the number of available output ports. The requirement entails a need to enlarge the server as a whole; it also means higher costs of the server.

OBJECT AND SUMMARY OF THE INVENTION

It is therefore an object of the present invention to provide an editing system and a video signal output system using the same whereby a special effect processor is assigned only one output port of the server.

An editing system according to the present invention is comprised of: a video signal reproducing device for reproducing video signals for a plurality of scenes from a storage medium and outputting the video signals for the scenes consecutively through an output port; a field/frame memory for storing either a field or a frame represented by the video signals coming from the output port; a special effect processor having two input terminals, one of the two input terminals being supplied with the video signals from the output port, the other input terminal being fed with output video signals from the field/frame memory; and a controller for controlling the writing and reading of data to and from the field/frame memory as well as the retaining of data in the field/frame memory; and the controller performs the control operations thereof in such a manner that the field/frame memory continuously supplies the special effect processor with the video signals representing either the last field or the last frame of any one of the scenes for a predetermined period.

The video signal reproducing device of the editing system according to the present invention, has a plurality of disks as the storage medium and reproduces the video signals representing the scenes from at least one of the plurality of disks.

In the editing system according to the present invention, the predetermined period corresponds to the period during which the special effect is continuously provided by the special effect processor.

The special effects provided by the editing system according to the present invention, consist of fade-in/fade-out, mix, dissolve, wipe and page turn.

The video signal reproducing device of the editing system according to the present invention reproduces the video signals representing the scenes in accordance with an editing list.

The controller of the editing system according to the present invention controls the field/frame memory in accordance with an editing list.

Further, an editing system according to the present invention is comprised of: a video signal reproducing device for reproducing video signals for a first plurality of scenes from a storage medium and outputting the video signals for the first plurality of scenes consecutively through a first output port, the video signal reproducing device further reproducing video signals for a second plurality of scenes from the storage medium and outputting the video signals for the second plurality of scenes consecutively through a second output port; a first field/frame memory for storing either a field or a frame represented by the video signals coming from the first output port; a second field/frame memory for storing either a field or a frame represented by the video signals coming from the second output port; a first special effect processor having two input terminals, one of the two input terminals being supplied with the video signals from the first output port, the other input terminal being fed with output video signals from the first field/frame memory; a second special effect processor having two input terminals, one of the two input terminals being supplied with the video signals from the second output port, the other input terminal being fed with output video signals from the second field/frame memory; a first controller for controlling the writing and reading of data to and from the first field/frame memory as well as the retaining of data in the first field/frame memory; and a second controller for controlling the writing and reading of data to and from the second field/frame memory as well as the retaining of data in the second field/frame memory; and the first and the second controllers perform the control operations thereof in such a manner that the first and the second field/frame memories continuously supply the first and the second special effect processors each with the video signals representing either the last field or the last frame of any one of the scenes for a predetermined period.

An editing system according to the present invention is comprised of: a video signal reproducing device for reproducing video signals for a first plurality of scenes from a storage medium and outputting the video signals for the first plurality of scenes consecutively through a first output port, the video signal reproducing device further reproducing video signals for a second plurality of scenes from the storage medium and outputting the video signals for the second plurality of scenes consecutively through a second output port; a first editing room supplied with the video signals from the first output port; and a second editing room supplied with the video signals from the second output port; and the first editing room includes a first field/frame memory for storing either a field or a frame represented by the video signals coming from the first output port; a first special effect processor having two input terminals, one of the two input terminals being supplied with the video signals from the first output port, the other input terminal being fed with output video signals from the first field/frame memory; and a first controller for controlling the writing and reading of data to and from the first field/frame memory as well as the retaining of data in the first field/frame memory; wherein the first controller performs the control operations thereof in such a manner that the first field/frame memory continuously supplies the first special effect processor with the video signals representing either the last field or the last frame of any one of the scenes for a predetermined period; wherein the second editing room includes a second field/frame memory for storing either a field or a frame represented by the video signals coming from the second output port; a second special affect processor having two input terminals, one of the two input terminals being supplied with the video signals from the second output port, the other input terminal being fed with output video signals from the second field/frame memory; and a second controller for controlling the writing and reading of data to and from the second field/frame memory as well as the retaining of data in the second field/frame memory; and wherein the second controller performs the control operations thereof in such a manner that the second field/frame memory continuously supplies the second special effect processor with the video signals representing either the last field or the last frame of any one of the scenes for a predetermined period.

Further, a video signal output system according to the present invention is comprised of: a video signal recording and reproducing device for recording externally supplied video signals to a storage medium, reproducing video signals for a plurality of scenes from the storage medium, and outputting the video signals for the scenes consecutively through an output port; a field/frame memory for storing either a field or a frame represented by the video signals coming from the output port; a special effect processor having two input terminals, one of the two input terminals being supplied with the video signals from the output port, the other input terminal being fed with output video signals from the field/frame memory; a controller for controlling the writing and reading of data to and from the field/frame memory as well as the retaining of data in the field/frame memory, in such a manner that the field/frame memory continuously supplies the special effect processor with the video signals representing either the last field or the last frame of any one of the scenes for a predetermined period; a switching device supplied with output video signals from the special effect processor, the switching device further outputting the supplied video signals selectively; a buffer recording and reproducing device for storing the output video signals from the switching device and outputting designated video signals in accordance with required timings; and an output controller for controlling the operations of the video signal recording and reproducing device, the switching device and the buffer recording and reproducing device.

The controller of the video signal output system according to the present invention supplies the output controller with the data for designating the video signals for any one of the scenes; and the output controller supplies the controller with any of two groups of data, one of the two group of data being constituted by reproduction position information of the video signals coming from the output port, the other group of data being composed of the video signals representing either the last field or the last frame of any one of the scenes.

A video signal output system according to the present invention is comprised of: a video signal recording and reproducing device for recording externally supplied video signals to a storage medium, reproducing video signals for a first plurality of scenes from the storage medium for consecutive video signal output through a first output port, and reproducing video signals for a second plurality of scenes from the storage medium for consecutive video signal output through a second output port; a first field/frame memory for storing either a field or a frame represented by the video signals coming from the first output port; a second field/frame memory for storing either a field or a frame represented by the video signals coming from the second output port; a first special effect processor having two input terminals, one of the two input terminals being supplied with the video signals from the first output port, the other input terminal being fed with output video signals from the first field/frame memory; a second special effect processor having two input terminals, one of the two input terminals being supplied with the video signals from the second output port, the other input terminal being fed with output video signals from the second field/frame memory; a first controller for controlling the writing and reading of data to and from the first field/frame memory as well as the retaining of data in the first field/frame memory, in such a manner that the first field/frame memory continuously supplies the first special effect processor with the video signals representing either the last field or the last frame of any one of the scenes for a predetermined period; a second controller for controlling the writing and reading of data to and from the second field/frame memory as well as the retaining of data in the second field/frame memory, in such a manner that the second field/frame memory continuously supplies the second special effect processor with the video signals representing either the last field or the last frame of any one of the scenes for a predetermined period; a switching device supplied with output video signals from the first and the second special effect processors, the switching device further outputting the supplied video signals selectively; a buffer recording and reproducing device for storing the output video signals from the switching device and outputting designated video signals in accordance with required timings; and an output controller for controlling the operations of the video signal recording and reproducing device, the switching device and the buffer recording and reproducing device.

Other objects, features and advantages of the present invention will become apparent in the following specification and accompanying drawings.

BRIEF DESCRIPTION OF THE DRAWINGS

FIGS. 4A to 4C are schematic views showing operations of the editing system and the video signal output system shown in FIG. 3;

FIGS. 5A to 5C are schematic views showing operations of the editing system and the video signal output system shown in FIG. 3;

DESCRIPTION OF THE PREFERRED EMBODIMENT

An embodiment of the invention pertaining to an editing system and a video signal output system will now be described with reference to the accompanying drawings.

Figure 1:
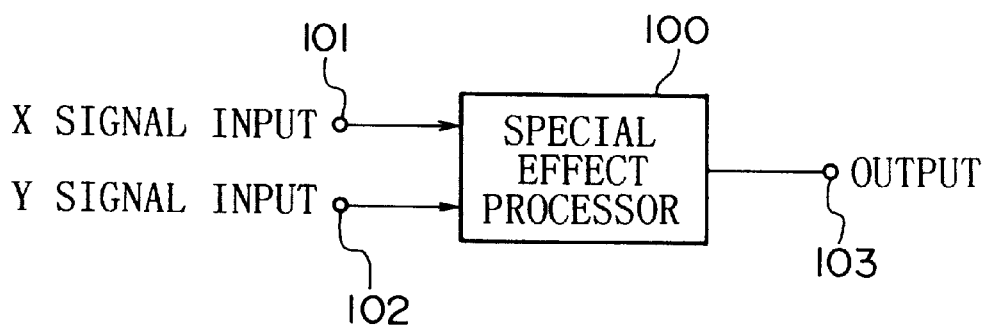
FIG. 1 is a schematic view outlining a conventional special effect processor.
Figure 2:
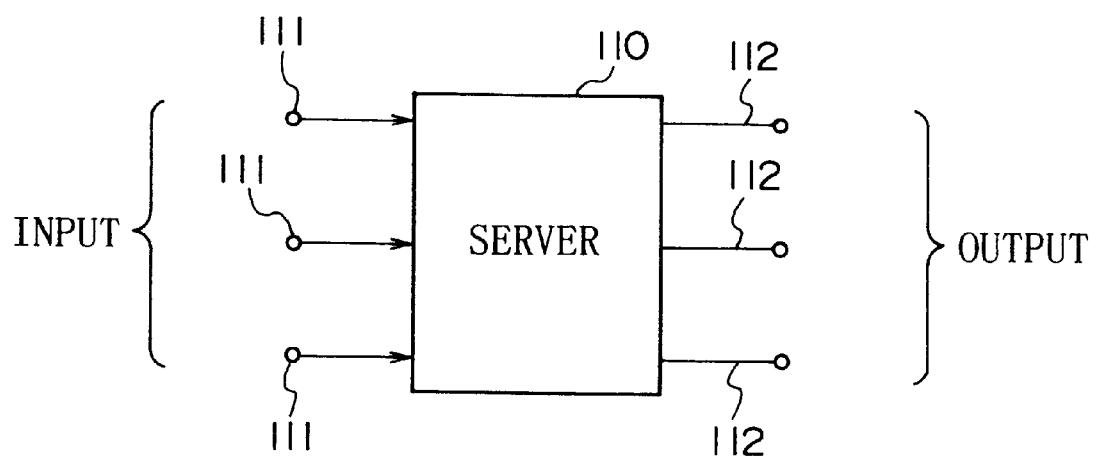
FIG. 2 is a schematic illustration of a server using disk drives.
Figure 3:
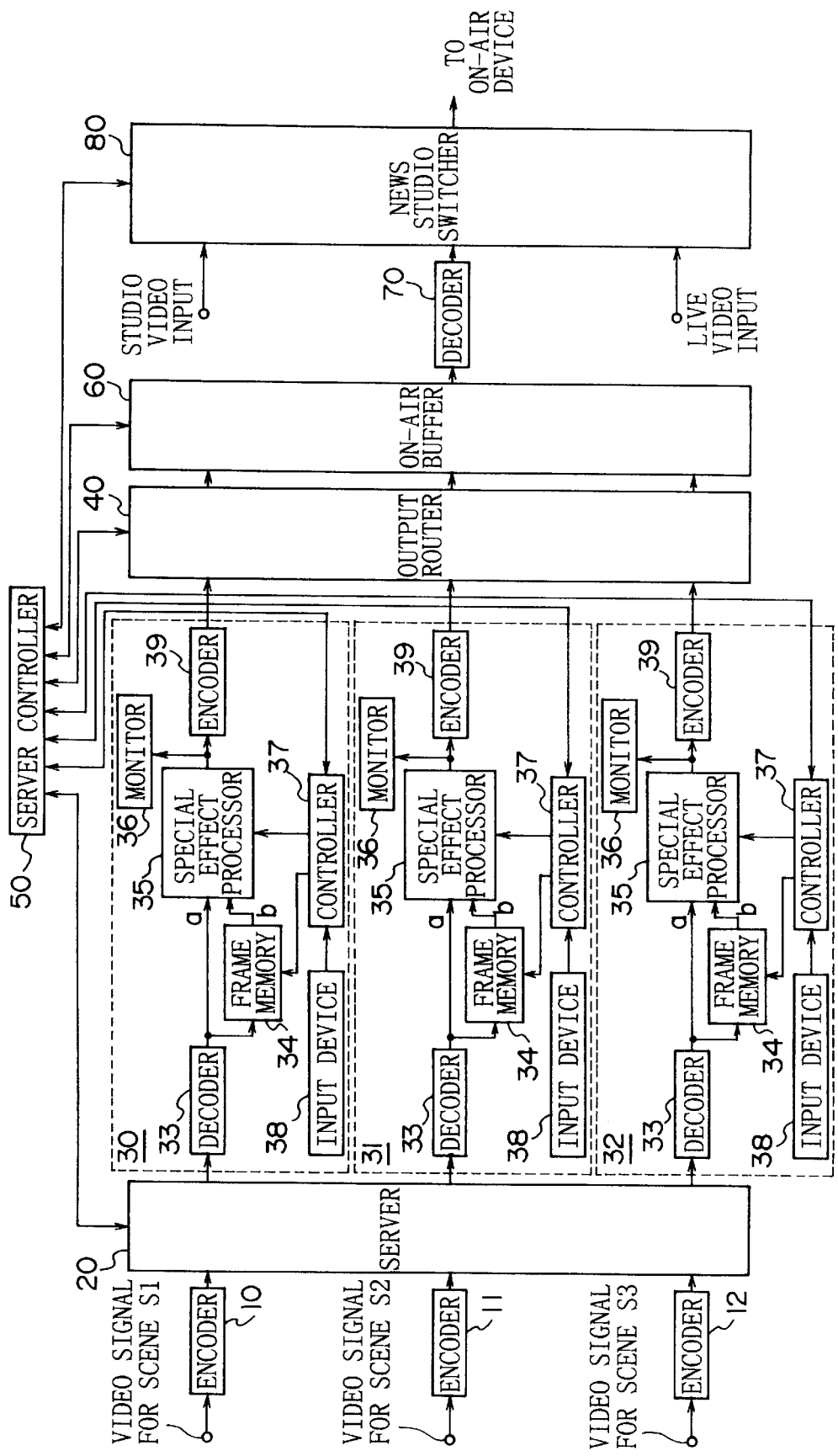
FIG. 3 is a schematic block diagram showing examples of an editing system and a video signal output system according to the invention.

FIG. 3 outlines a video signal output system incorporating an editing system according to the invention. In FIG. 3, the video signals for scenes S1, S2 and S3 are input via input terminals 1 through 3 to encoders 10, 11 and 12 in the signal format of the SDI method or the like. The encoders 10, 11 and 12 subject the video signals for the scenes S1, S2 and S3 to a data compression process for conversion into the signal format of, say, the SDDI method. The video signals are then fed to a server 20.

The format of the SDI method is a signal format in which digital video signals are transmitted as serial signals. The format is standardized under SMPTE-295M of the SMPTE (Society of Motion Television and Engineers).

The SDDI format is a signal format in which data-compressed digital video signals use transmission packets common to those of the video signals of the SDI method. The data length, frame constitution and data transmission speed of each SDI video signal line are the same as those of the digital video signals of the SDDI method.

The SDDI video signals for the scenes S1, S2 and S3 fed from the encoders 10, 11 and 12 to the server 20 are converted by the server to the SCSI signal format (transmission format). The converted video signals are recorded continuously in appropriate areas of a disk, not shown, inside the server 20.

How the video signals are recorded on the disk is described below with reference to FIG. 4A. The video signal for the scene S1 is written to an area A of the disk; the video signal for the scene S2 is written to an area B adjacent to the area A; and the video signal for the scene S3 is written to an area C adjacent to the area B. The recording areas A through C may be physically separate.

Editing rooms 30 through 32 may then request the video signals for the scenes S1, S2 and S3. In that case, the video signals for the scenes S1 through S3 are read from appropriate locations on the disk in an appropriate order. The retrieved video signals are fed to the editing rooms 30 through 32 that issued the requests.

What follows is a description of how the editing rooms 30 through 32 are illustratively structured. Because these rooms are identical in structure, the editing room 30 alone will be described. The editing room 30 comprises a decoder 33, a frame memory 34, a special effect processor 35, a monitor 36, a controller 37, an input device 38 and an encoder 39.

Video signals may be processed in units of either frames or fields. The description that follows assumes the use of frames as the units for signal processing. The memory to be used is thus a frame memory which obviously may be replaced by a field memory if video signals are processed in units of fields.

The decoder 33 is supplied with the SDDI video signals read from the server 20. The supplied video signals are expanded by the decoder 33, and the expanded video signals are converted to the SDI signal format and fed to one input terminal of the special effect processor 35. The video signals are also sent to the frame memory 34. The output of the frame memory 34 is fed to the other input terminal of the special effect processor 35.

The individual video signals fed to the special effect processor 35 are subject to any one of such special effects as fade-in/fade-out, mix, dissolve, wipe and page turn. The processed video signals are switched and output as needed. The output video signal from the special effect processor 35 is sent to the encoder 39 and motor 36.

The encoder 39 converts the output video signal from the special effect processor 35 into the SDDI signal format. The converted video signal is fed to an output router 40.

The controller 37 in the editing room 30 controls the refreshing of the frame memory 34, the retaining of video signals in the frame memory 34, and the operation of the special effect processor 35. In response to an input signal from the input device 38 manipulated by an operator, the controller 37 supplies a server controller 50 with data for designating the video signals for operator-selected scenes so that these video signals will be retrieved from the server 20 and sent to the editing room 30.

The video signal designating data comprises elements of information taken from the reproduction position information supplied from the server controller 50 regarding the video signals for the scenes. The information elements are made up of the position information representing an in-point and an out-point for editing of each desired scene, and the numbers of the video signals corresponding to the selected scenes, the numbers being chosen from among those attached to the video signals for all scenes.

On the basis of the video signal designating data, the server controller 50 controls the server 20 in such a manner that the video signals for the selected scenes will be retrieved from the server 20.

Suppose that the video signals for the scenes S1, S3 and S2 are designated by the operator for retrieval in that order, as shown in FIG. 4B. In that case, the applicable video signals are read in the designated order from the server 20 and supplied through one output port of the server to the decoder 33 in the editing room 30.

Given the video signals from the output port of the server 20, the decoder 33 expands the signals for conversion to the SDI signal format. The converted video signals are fed to the frame memory 34 as well as to one input terminal a of the special effect processor 35.

Besides controlling the server 20 in its read operation as described, the server controller 50 supplies the controller 37 with the reproduction position information of the video signals sent from the server 20 to the decoder 33 and/or the data for indicating the last frame of a given scene.

If a field memory were used in place of the frame memory 34, the data indicating the last field of a given scene instead of the last frame would be sent to the controller 37. Because handling frame data is analogous to manipulating field data as described, no more details of field data manipulations will be discussed hereunder.

When the video signal data indicating the last frame of a given scene is not supplied from the server controller 50 to the controller 37, the controller 37 controls the write and read operations to and from the frame memory 34 in such a manner that the video signals fed from the decoder 33 to the frame memory 34 will be supplied to the other input terminal b of the special effect processor 35 without substantial delay. It is also possible to determine the last frame of the scene in the controller 37 based on two kinds of information: the reproduction position information from the server controller 50, and the position information indicating the out-point of the scene stored in the controller 37.

Later, if the server controller 50 supplies the controller 37 with the data indicating the last frame of a given scene, or if the controller 37 has internally determined the last frame, the controller 37 controls the frame memory 34 so that the last frame of the video signals fed from the decoder 33 to the frame memory 34 will be retained therein for a predetermined period of time.

The special effect processor 35 is switched over from the video signal for the scene fed to the input terminal b, to the video signal for the scene supplied to the input terminal a, so as to bring about the special effect (fade-in/face-out, etc.) designated from the input device 38. The switchover is accomplished by the controller 37 feeding the special effect processor 35 with translated address generation data and interpolation coefficient generation data for obtaining the designated special effect. The generation data are fed to the special effect processor 35 when the data indicating the last frame of the scene is supplied from the server controller 50 or when the last frame is determined in the controller 37.

Given a key signal and/or the data for translated address generation or interpolation coefficient generation from the controller 37, the special effect processor 35 switches from the input terminal b to the input terminal a for the video signal output entailing the designated special effect on the desired scene.

The transient time in which the special effect lasts is usually set ranging from a few frames to a few seconds. Under control of the cntroller 37, the frame memory 34, having stored the last frame of the video signal representing a given scene, retains that frame at least until the transient time expires.

How the video signals for the scenes involving the special effects are switched over will now be described with reference to FIGS. 4A through 4C. Referring to FIG. 4A, the video signal for the scene S1 is read from the server 20 and sent through the decoder 33 to the frame memory 34. The frame memory 34 forwards the video signal for the scene S1 to the input terminal b of the special effect processor 35 without substantial delay unless and until the controller 37 intervenes for control of data retention.

Given the video signal for the scene S1 via the input terminal b, the special effect processor 35 allows the signal to be output unmodified to the encoder 39 and monitor 36. When the last frame of the video signal representing the scene S1 is written to the frame memory 34, the controller 37 controls the frame memory 34 so that the last frame of the signal will be retained therein during the transient period. Following the last frame of the video signal representing the scene S1, the video signal for the scene S3 is fed to the input terminal a of the special effect processor 35 as shown in FIG. 4B. The input video signal is processed for the special effect previously designated, and allowed to succeed the last frame of the video signal representing the scene S1 held in the frame memory 34. The transient portion (with the special effect) involving the switchover from the scene S1 to the scene S3 is shown shaded in FIG. 4C. This shaded portion denotes a special effect picture made up of a still picture by the video signal for the scene S1 on the one hand, and of a dynamic picture by the video signal for the scene S3 on the other hand.

Past the transient period involving the video signals for the scenes S1 and S3, the special effect processor 35 outputs the video signal for the scene S3 unmodified. The video signal for the scene S3 is also supplied to the frame memory 34. When supplied with the video signal representing the last frame of the scene S3 from the server controller (i.e., output controller) 50, the frame memory 34 retains that last frame and also forwards it to the input terminal b of the special effect processor 35. Subsequent to the video signal for the scene S3, the server 20 feeds the video signal for the scene S2 to the input terminal a of the special effect processor 35 as shown in FIG. 4B. The input video signal representing the scene S2 is processed for the special effect previously designated, and allowed to succeed the last frame of the video signal representing the scene S2 held in the frame memory 34.

The transient portion (with the special effect) involving the switchover from the scene S3 to the scene S2 is shown shaded in FIG. 4C. This shaded portion denotes a special effect picture composed of a still picture by the video signal for the scene S3 on the one hand, and of a dynamic picture by the video signal for the scene S2 on the other hand.

In ascertaining the processed image on the monitor 36, the operator manipulates the input device 38 so that the video signals for the desired scenes can be switched over together with necessary special effects. The operator continues the manipulations until the completion of an editing list specifying the required video signal switchover involving the desired special effects. With the editing list completed, the system is allowed to switch the video signals for the necessary scenes involving the special effects in accordance with that list. The edited result is sent through the output router 40 to an on-air buffer 60 for storage therein.

The cross points of the output router 40 are turned on and off under control of the server controller 50. During the preparatory period up to the completion of an editing list, the applicable cross points of the on-air buffer 60 are turned off so that the output of the special effect processor 35 will not reach the on-air buffer 60.

How the editing system of the invention works alternatively will now be described with reference to FIGS. 5A through 5C.

FIG. 5A shows typical video and audio signals supplied externally to the server 20. This example involves the video signals for the scenes S1, S2, S3 and S4. Any of the video signals for these scenes is fed to the server 20 through any one of the encoders 10, 11 and 12. The video signals for the scenes are made up of video signals reproduced by VTR's or like recording/reproducing devices and of pickup image outputs from cameras.

It may happen that the video signals for all scenes are output by the same device; it may also happen that the video signals for various scenes are output by various different devices. The video signals for all scenes may be input through the same input port of the server 20, or the signals for various scenes may be input through different input ports of the server 20.

FIG. 5B illustrates an example in which the video signals for various scenes are recorded on a storage medium (e.g., disk) inside the server 20. A voice-over file located adjacent to the video signal for the scene S4 is made up of the audio signals that are input to the server 20 from microphones and other sources.

FIG. 5C indicates an example involving edited video signals that are output from the editing room 30. In this example, the controller 37 in the editing room 30 sends to the server controller 50 requests for the retrieval of the video signals for the scenes S1 through S4, for the order in which the signals are to be retrieved, and for the timing for the video signal retrieval. In response, the server controller 50 controls the server 20 in such a manner that the video signals for the scenes S1 through S4 will be fed to the editing room 30. Specifically, based on a request signal from the server controller 50, the server 20 reproduces the video signals for the scenes S1 through S4 and sends these signals to the editing room 30.

In the editing room 30, the operator determines the in-point and out-point of the video signal for each scene while watching the monitor. The controller 37 supplies the server controller 50 with the data indicating the determined in-point and out-point of the video signal for each scene.

In accordance with the data indicating the in-points and out-points, the server controller 50 controls the server 20 so that the video signals for a scene S1-1, for the scenes S3 and S2, and for a scene S4-1 will be sent consecutively to the editing room 30. As needed and in the manner described above, special effects are added to the connecting part between any two of the above video signals for the scenes, as shown in FIG. 5C. The processed video signals are output from the editing room 30. In the example of FIG. 5C, the connecting part between the video signal for the scene S1-1 and that for the scene S3 is provided with a special effect, and so is the connecting part between the video signal for the scene S3 and that for the scene S2. No special effect is attached to the video signals for the scenes S2 and S4-1; there is a "cut" between the two scenes.

The editing room 30 contains an audio signal processor (not shown) for adding such special effects as audio fade-in/fade-out on audio signals. The voice-over file retained in the server 20 may be made to correspond and attach to the video signal for each of the scenes, as needed, by the audio signal processor. In the example of FIG. 5C, the voice-over file is attached integrally to the edited video signal for the scene S2 and partially to the edited video signal for the scene S4-1.

The description above has centered on the editing room 30 alone. The constitution and the workings of the other editing rooms, 31 and 32, are the same as those of the editing room 30 and thus will not be described further.

The on-air buffer 60 is supplied with the edited video signals from the editing room 30, 31 and 32. These video signals are stored into the on-air buffer 60 under control of the server controller 50. The server controller 50 stores an output list for broadcast purposes. When a starting time arrives for the broadcast of certain scenes according to the output list, the server controller 50 controls the read operation of the on-air buffer 60 so that the applicable edited video signals will be read therefrom.

It is the operator that supplies the server controller 50 with an instruction for starting the video signal output. Given the instruction, the server controller 50 controls the read operation of the on-air buffer 60 for the read-out of the applicable edited video signals from the buffer.

The edited video signals read from the on-air buffer 60 are sent to a decoder 70 for data expansion. The expanded video signals are fed to a news studio switcher 80. In addition to the output signals from the decoder 70, the news studio switcher 80 is also supplied with the output video signals from television cameras taking pictures of the newscasters in the studio as well as the video signals of live scenes taken outdoors.

The server controller 50 controls the switching operation of the news studio switcher 80 in accordance with the broadcast output list stored in the controller 50 and on the basis of the instructions given in real time by the operator. The video signals output by the news studio switcher 80 are fed to an on-air device, not shown.

Figure 6:
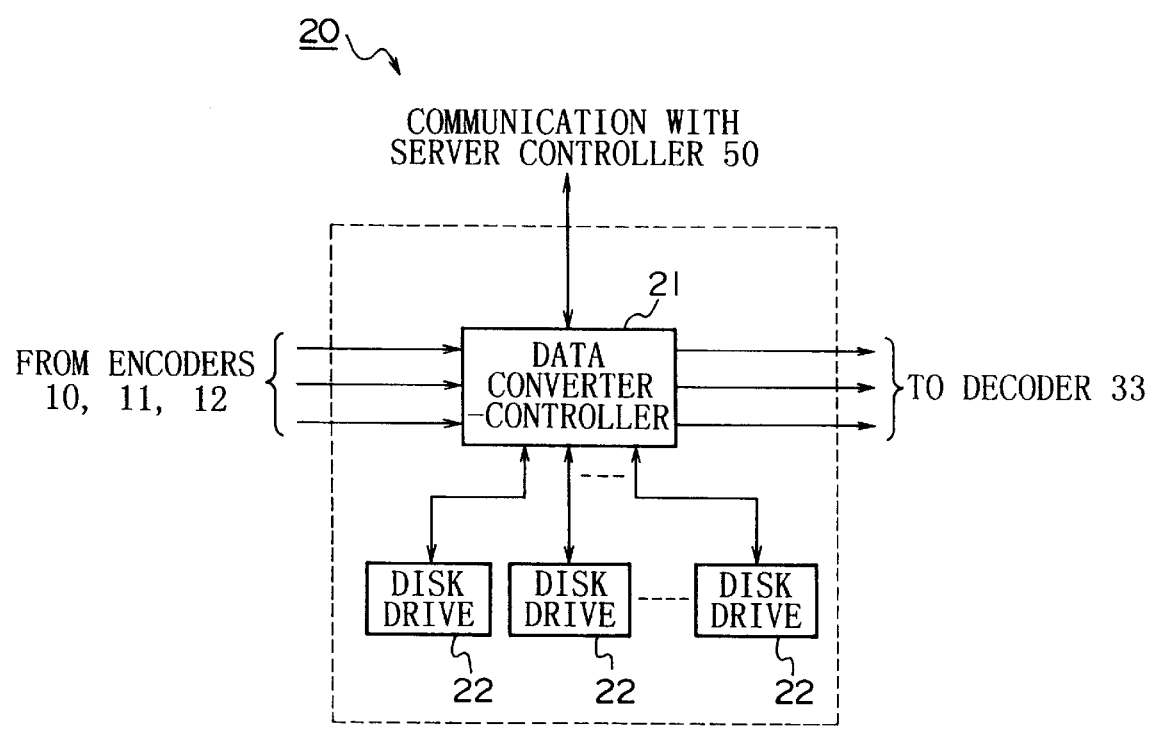
FIG. 6 is a schematic block diagram showing an example of a server of the editing system and the video signal output system shown in FIG. 3.

How the server 20 is structured will now be described with reference to FIG. 6. The server 20 comprises a data converter-controller 21 and a plurality of disk drives 22. The disk drives 22 are each loaded with a disk type storage medium such as hard disks and magneto-optical disks.

The video signals sent from the encoders 10, 11 and 12 shown in FIG. 3 to the server 20 are converted to the SCSI signal format by the data converter-controller 21. The converted video signals are later written to the storage medium in the disk drives 22 under control of the data converter-controller 21. The data converter-controller 21 is controlled in operation by the server controller 50. The read and write status of the data converter-controller 21 is submitted to the server controller 50.

When the server controller 50 supplies the data converter-controller 21 with control signals designating reproduction positions and reproduction start timings, the data converter-controller 21 controls the disk drives 22 accordingly to read the necessary video signals from the storage medium in the latter. The video signals read from the storage medium are converted from SCSI signal format to SDDI signal format by the data converter-controller 21. The converted signals are fed to the respective decoders 33.

The basic constitution of the on-air buffer 60 is the same as that of the server 20, and thus will not be described further.

Figure 7:
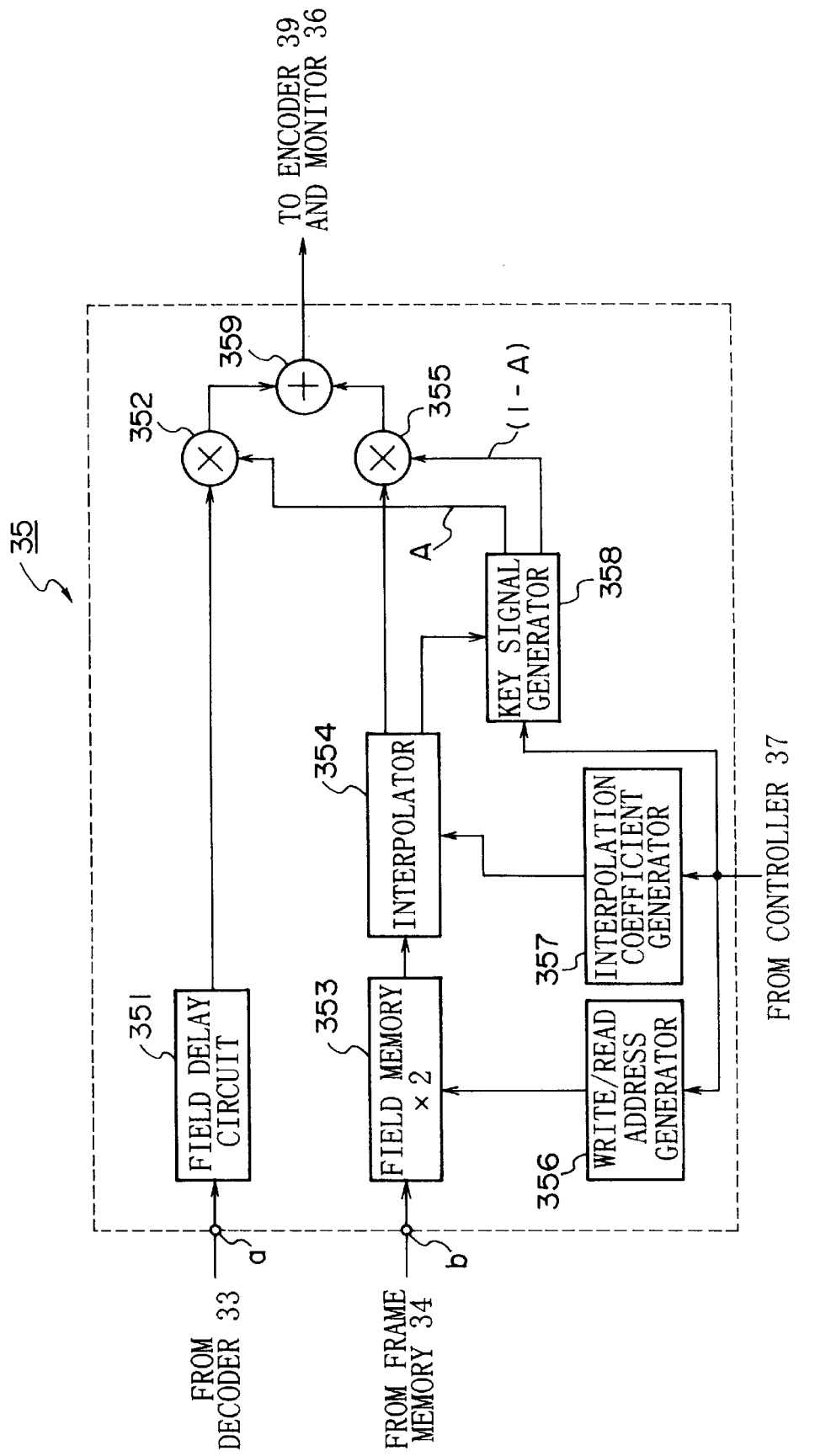
FIG. 7 is a schematic block diagram showing an example of a special effect processor of the editing system and the video signal output system shown in FIG. 3.

Described below with reference to FIG. 7 is a typical structure of the special effect processor 35 furnished in the editing rooms 30, 31 and 32.

The video signal from any one decoder 33 is sent to a field delay circuit 351. Delayed by one field, the video signal is then forwarded from the field delay circuit 351 to a multiplier 352. The video signal from the frame memory 34 is supplied alternately to two field memories 353. Of the two memories 353, the one not currently fed with a video signal allows its stored video signal to be read therefrom. The video signal retrieved from the field memory 353 is sent to an interpolator 354. The interpolated video signal is fed to a multiplier 355.

The two field memories 353 are each fed with a write address and a read address from a write/read address generator 356. The write/read address generator 356 receives modified data from the controller 37 based on the input manipulations of the operator. In accordance with the modified data, the write/read address generator 356 supplies the field memories 353 with a write address and a modified read address different from the write address so that the modified video signal will be output as desired from each field memory 353. If the input video signal is to be output unmodified, the write/read address generator 356 outputs a write address and a read address which are identical to each other.

Where any pixel position of the modified video signal lacks the pixel corresponding to the input video signal, the interpolator 354 generates pixel data for the pixel position in question by utilizing pixel data in the vicinity of that pixel position. An interpolation coefficient generator 357 generates an interpolation coefficient and supplies it to the interpolator 354 in accordance with the modified data fed from the controller 37 based on the operator's input manipulations. In this case, the read address output by the write/read address generator 356 serves as the read address allowing pixel data to be read from the nearby pixel position mentioned above. The interpolation coefficient is a value relevant to the distance between the pixel position whose data is to be obtained by interpolation on the one hand, and the nearby pixel position on the other hand.

A key signal generator 358 receives a key signal indicating the external shape of the modified video signal from the interpolator 354. The key signal is modified in keeping with the modification of the video signal by each field memory 353, and is interpolated by the interpolator 354.

Based on the input key signal, the key signal generator 358 generates key signals A and 1-A (A denotes any coefficient) that are sent respectively to the multipliers 352 and 355. The key signals A and 1-A are used to control two signals levels in a complementary manner: the level of the video signal fed from the field delay circuit 351 to the multiplier 352, and the level of the video signal sent from the interpolator 354 to the multiplier 355.

The multipliers 352 and 355 multiply the received video signals and the supplied key signals A and 1-A respectively, and send the resulting signals to an adder 359. The adder 359 adds the supplied video signals and feeds the result to the encoder 39 and monitor 36.

Thereafter, the video signal fed by the decoder 33 and the video signal coming from the frame memory 34 and modified by the field memories 353 and interpolator 354 are synthesized in accordance with the key signals.

It may be desired to provide a special effect without signal modification. In such a case, the video signal sent from the frame memory 34 to the field memories 353 is forwarded to the multiplier 355 without going through any modification by the field memories 353 or by the interpolator 354.

In the case above, the operator manipulates the input device 38 to select the desired special effect (e.g., fade-in/fade-out, mix, dissolve, wipe). When thus operated, the input device 38 sends appropriate data to the controller 37. In response, the controller 37 supplies the key signal generator 358 with data designating the selected special effect.

Given the data, the key signal generator 358 generates the key signals A and 1-A to be sent to the multipliers 352 and 355 respectively. The multipliers 352 and 355 multiply the received video signals and the supplied key signals A and 1-A respectively, and send the resulting signals to the adder 359. The adder 359 in turn adds up the received video signals and feeds its output to the encoder 39 and monitor 36.

Thereafter, the video signal from the decoder 33 and the video signal from the frame memory 34 are switched over for output together with the selected special effect (e.g., fade-in/fade-out, mix, dissolve, wipe). The switched signal output is sent to the encoder 39 and monitor 36.

The output router 40 has a plurality of inputs and a plurality of outputs. These input and outputs are selectively connected in matrix fashion by cross point switches. The cross point switches for the output router 40 are turned on and off under control of the server controller 50.

Given control signals from the server controller 50, the news studio switcher 80 switches and selectively outputs the video signal output by the decoder 70, the studio video input and the live video input. Upon switchover, the signal output may be accompanied by a special effect such as wipe or mix. Alternatively, a screen split feature or the like may be activated to output the input video signals simultaneously. The news studio switcher 80 may be operated not under control of the server controller 50 but by direct intervention of the operator.

As described, the inventive system may provide a transient period between scenes involving a special effect. For special effect processing, the last frame or last field of the video signal for one scene is stored into memory while the video signal for the ensuing scene is fed to the special effect processor following the stored last frame or last field. Upon switchover during the transient period, the system switches from the last frame or last field of the video signal for one scene to the video signal for the next scene, accompanied by the previously designated special effect.

The video signal for the scene held in the frame memory or field memory constitutes a still picture, whereas the video signal for the ensuing scene forms a dynamic picture. Past the transient period for the signal switchover, the video signal for the succeeding scene is output unmodified.

Where the special effect processor of the inventive system has the field/frame memory arrangement described above, the server may have only one output port assigned to the special effect processor but the video signals for a plurality of scenes coming through that port are still treated efficiently for special effects.

As many apparently different embodiments of this invention may be made without departing from the spirit and scope thereof, it is to be understood that the invention is not limited to the specific embodiments thereof except as defined in the appended claims.

What is claimed is:

1. An editing system comprising:
a video signal reproducing device for reproducing video signals for a first plurality of scenes from a storage medium, comprising a plurality of individual disc media, and outputting said video signals for said first plurality of scenes consecutively through a first output port out of a plurality of output ports, said video signal reproducing device further reproducing video signals for a second plurality of scenes from said storage medium and outputting said video signals for said second plurality of scenes consecutively through a second output port out of said plurality of output ports;

a first field/frame memory for storing either a field or a frame represented by the video signals coming from said first output port;

a second field/frame memory for storing either a field or a frame represented by the video signals coming from said second output port;

a first special effect processor having two input terminals, one of the two input terminals being supplied with the video signals corresponding to a second one of said first plurality of scenes from said first output port, the other input terminal being fed with output video signals corresponding to said first one of said first plurality of scenes from said first field/frame memory, said first special effect processor providing any one of a plurality of special effects outputting at least a portion of said second one of said first plurality of scenes and said first one of said first plurality of scenes simultaneously;

a second special effect processor having two input terminals, one of the two input terminals being supplied with the video signals corresponding to a second one of said second plurality of scenes from said second output port, the other input terminal being fed with output video signals corresponding to said first one of said second plurality of scenes from said second field/frame memory, said second special effects processor providing any one of a plurality of special effects outputting at least a portion of said second one of said second plurality of scenes and said first one of said second plurality of scenes;

a first controller for controlling the writing and reading operations of data to and from said first field/frame memory as well as the retaining operation of data in said first field/frame memory; and a second controller for controlling the writing and reading operations of data to and from said second field/frame memory as well as the retaining operation of data in said second field/frame memory;

wherein said first and said second controllers perform the control operations thereof in such a manner that said first and said second field/frame memories continuously supply said first and said second special effect processors each with the video signals representing either the last field or the last frame of said first one of said first or second plurality of scenes, respectively, for a predetermined period said first and second special effects processors thus each simultaneously providing output video, each including special effects.

2. The editing system according to claim 1, wherein said video signal reproducing device has a plurality of disks as said storage medium and reproduces said video signals representing said scenes from at least one of said plurality of disks.

3. The editing system according to claim 2, wherein said video signal reproducing device reproduces said video signals representing said first and second plurality of scenes in accordance with an editing list.

4. The editing system according to claim 1, wherein said predetermined period corresponds to the period during which the special effect is continuously provided by said special effect processor.

5. The editing system according to claim 1, wherein each of said special effect processor provides any one of the special effects consisting of fade-in/fade-out, mix, dissolve, wipe and page turn.

6. The editing system according to claim 1, wherein said first and second controller each controls said respective first and second field/frame memories in accordance with an editing list.

7. An editing system comprising:

a video signal reproducing device for reproducing video signals for a first plurality of scenes from a storage medium, comprising a plurality of individual disc media, and outputting said video signals for said first plurality of scenes consecutively through a first output port out of a plurality of output ports, said video signal reproducing device further reproducing video signals for a second plurality of scenes from said storage medium and outputting said video signals for said second plurality of scenes consecutively through a second output port out of said plurality of output ports;

a first editing room supplied with the video signals from said first output port, said first editing room including a first field/frame memory for storing either a field or a frame represented by the video signals corresponding to a first one of said first plurality of scenes coming from said first output port; a first special effect processor having two input terminals, one of the two input terminals being supplied with the video signals corresponding to a second one of said first plurality of scenes from said first output port, the other input terminal being fed with output video signals corresponding to said first one of said first plurality of scenes from said first field/frame memory, said first special effect processor providing any one of a plurality of special effects outputting at least a portion of said second one of said first plurality of scenes and said first one of said first plurality of scenes simultaneously; and a first controller for controlling the writing and reading operations of data to and from said first field/frame memory as well as the retaining operation of data in said first field/frame memory, said first controller performing the control operations thereof in such a manner that said first field/frame memory continuously supplies said first special effect processor with the video signals representing either the last field or the last frame of said first one of said first plurality of scenes for a predetermined period; and a second editing room supplied with the video signals from said second output port, said second editing room including a second field/frame memory for storing either a field or a frame represented by the video signals corresponding to a first one of said second plurality of scenes coming from said second output port; a second special effect processor having two input terminals, one of the two input terminals being supplied with the video signals corresponding to a second one of said second plurality of scenes from said second output port, the other input terminal being fed with output video signals corresponding to said first one of said second plurality of scenes from said second field/frame memory, said second special effects processor providing any one of a plurality of special effects outputting at least a portion of said second one of said second plurality of scenes and said first one of said second plurality of scenes; and a second controller for controlling the writing and reading operations of data to and from said second field/frame memory as well as the retaining operation of data in said second field/frame memory, said second controller performing the control operations thereof in such a manner that said second field/frame memory continuously supplies said second special effect processor with the video signals representing either the last field or the last frame of said first one of said second plurality of scenes for a predetermined period, said first and second special effects processors each simultaneously providing output video, each including special effects.

8. A video signal output system comprising:

a video signal recording and reproducing device for recording externally supplied video signals to a storage medium, comprising a plurality of individual disc media, reproducing video signals for a first plurality of scenes from said storage medium for consecutive video signal output through a first output port out of a plurality of output ports, and reproducing video signals for a second plurality of scenes from said storage medium for consecutive video signal output through a second output port out of said plurality of output ports;

a first field/frame memory for storing either a field or a frame represented by the video signals corresponding to a first one of said first plurality of scenes coming from said first output port;

a second field/frame memory for storing either a field or a frame represented by the video signals corresponding to a first one of said second plurality of scenes coming from said second output port;

a first special effect processor having two input terminals, one of the two input terminals being supplied with the video signals corresponding to a second one of said first plurality of scenes from said first output port, the other input terminal being fed with output video signals corresponding to said first one of said first plurality of scenes from said first field/frame memory, said first special effect processor providing any one of a plurality of special effects outputting at least a portion of said second one of said first plurality of scenes and said first one of said first plurality of scenes simultaneously;

a second special effect processor having two input terminals, one of the two input terminals being supplied with the video signals corresponding to a second one of said second plurality of scenes from said second output port, the other input terminal being fed with output video signals corresponding to said first one of said second plurality of scenes from said second field/frame memory, said second special effects processor providing any one of a plurality of special effects outputting at least a portion of said second one of said second plurality of scenes and said first one of said second plurality of scenes;

a first controller for controlling the writing and reading operations of data to and from said first field/frame memory as well as the retaining operation of data in said first field/frame memory, in such a manner that said first field/frame memory continuously supplies said first special effect processor with the video signals representing either the last field or the last frame of said first one of said first plurality of scenes for a predetermined period;

a second controller for controlling the writing and reading operations of data to and from said second field/frame memory as well as the retaining operation of data in said second field/frame memory, in such a manner that said second field/frame memory continuously supplies said second special effect processor with the video signals representing either the last field or the last frame of said first one of said second plurality of scenes for a predetermined period;

a switching device simultaneously supplied with output video signals from said first and said second special effect processors, said switching device further outputting the supplied video signals selectively;

a buffer recording and reproducing device for storing the output video signals from said switching device and outputting designated video signals in accordance with required timings; and an output controller for controlling the operations of said video signal recording and reproducing device, said switching device and said buffer recording and reproducing device.

* * * * *